United States Patent
Tenghamn

(10) Patent No.: US 9,618,637 B2
(45) Date of Patent: Apr. 11, 2017

(54) LOW FREQUENCY MARINE ACOUSTIC VIBRATOR

(71) Applicant: PGS Geophysical AS, Oslo (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/284,847

(22) Filed: May 22, 2014

(65) Prior Publication Data

US 2015/0085605 A1    Mar. 26, 2015

Related U.S. Application Data

(60) Provisional application No. 61/880,561, filed on Sep. 20, 2013.

(51) Int. Cl.
| | | |
|---|---|---|
| *G01V 1/145* | (2006.01) | |
| *G01V 1/38* | (2006.01) | |
| *G01V 1/04* | (2006.01) | |
| *G01V 1/02* | (2006.01) | |

(52) U.S. Cl.
CPC .............. *G01V 1/04* (2013.01); *G01V 1/145* (2013.01); *G01V 1/159* (2013.01); *G01V 1/38* (2013.01); *G01V 2210/1293* (2013.01)

(58) Field of Classification Search
CPC .......... G01V 1/04; G01V 1/145; G01V 1/159; G01V 1/38; G01V 2210/1293
USPC ........... 181/110, 111, 113, 120; 367/15, 143, 367/168, 174, 189
See application file for complete search history.

(56) References Cited

U.S. PATENT DOCUMENTS

| | | | |
|---|---|---|---|
| 3,370,672 A | | 2/1968 | Eberlan |
| 3,384,868 A | | 5/1968 | Brown |
| 3,691,516 A | | 9/1972 | Graham et al. |
| 3,978,940 A | | 9/1976 | Bouyoucos |
| 4,175,311 A | | 11/1979 | Bunyan |
| 4,185,714 A | | 1/1980 | Pascouet et al. |
| 4,211,301 A | | 7/1980 | Mifsud |
| 4,231,112 A | | 10/1980 | Massa |
| 4,483,411 A | * | 11/1984 | Mifsud .................. G01V 1/145 181/120 |
| 4,556,963 A | | 12/1985 | Hugus et al. |

(Continued)

FOREIGN PATENT DOCUMENTS

| | | |
|---|---|---|
| EP | 0835462 B1 | 1/2003 |
| RU | 93052952 A | 2/1995 |

(Continued)

OTHER PUBLICATIONS

Rune Tenghamn, "PGS Electrical Marine Vibrator," Tech Link, Nov. 2005, pp. 1-3, vol. 5, No. 11, Publication of PGS Geophysical.

(Continued)

*Primary Examiner* — Jeremy Luks

(57) ABSTRACT

Embodiments relate to marine acoustic vibrators that incorporate one or more piston plates that act on the surrounding water to produce acoustic energy. An example marine acoustic vibratory may comprise: a containment housing; a piston plate; a fixture coupled to the containment housing; a spring element coupled to the piston plate and the fixture; and a driver coupled to the piston plate and the fixture and configured to move the piston plate back and forth.

25 Claims, 9 Drawing Sheets

(56) References Cited

U.S. PATENT DOCUMENTS

| | | | |
|---|---|---|---|
| 4,557,348 A * | 12/1985 | Mifsud | G01V 1/145 181/120 |
| 4,578,784 A * | 3/1986 | Mifsud | G01V 1/145 181/110 |
| 4,739,859 A | 4/1988 | Delano | |
| 4,785,430 A | 11/1988 | Cole | |
| 4,853,905 A | 8/1989 | Myers | |
| 4,868,799 A | 9/1989 | Massa | |
| 5,016,228 A | 5/1991 | Arnold et al. | |
| 5,050,129 A | 9/1991 | Schultz | |
| 5,062,089 A | 10/1991 | Willard et al. | |
| 5,126,979 A | 6/1992 | Rowe, Jr. et al. | |
| 5,199,005 A | 3/1993 | Forsberg | |
| 5,206,839 A | 4/1993 | Murray | |
| 5,225,731 A | 7/1993 | Owen | |
| 5,233,570 A | 8/1993 | Donskoy | |
| 5,646,380 A | 7/1997 | Vaage | |
| 5,757,726 A | 5/1998 | Tenghamn et al. | |
| 5,757,728 A | 5/1998 | Tenghamn et al. | |
| 5,959,939 A | 9/1999 | Tenghamn et al. | |
| 5,978,316 A * | 11/1999 | Ambs | H04B 11/00 181/120 |
| 6,009,047 A | 12/1999 | Barger | |
| 6,041,888 A | 3/2000 | Tenghamn | |
| 6,076,629 A | 6/2000 | Tengham | |
| 6,076,630 A | 6/2000 | Ambs | |
| 6,085,862 A | 7/2000 | Tenghamn | |
| 6,173,803 B1 | 1/2001 | Barger | |
| 6,230,840 B1 | 5/2001 | Ambs | |
| 6,556,510 B2 | 4/2003 | Ambs | |
| 6,606,958 B1 | 8/2003 | Bouyoucos | |
| 6,624,539 B1 | 9/2003 | Hansen et al. | |
| 6,711,097 B1 * | 3/2004 | Engdahl | G10K 9/121 367/174 |
| 6,851,511 B2 | 2/2005 | Tenghamn | |
| 6,901,028 B2 | 5/2005 | Clayton et al. | |
| 7,142,481 B1 | 11/2006 | Metzbower et al. | |
| 7,377,357 B2 | 5/2008 | Duren et al. | |
| 7,468,932 B2 | 12/2008 | Tenghamn | |
| 7,539,079 B2 | 5/2009 | Hoogeveen et al. | |
| 7,551,518 B1 | 6/2009 | Tenghamn | |
| 7,562,740 B2 | 7/2009 | Ounadjela | |
| 7,881,158 B2 | 2/2011 | Tenghamn | |
| 7,926,614 B2 | 4/2011 | Tenghamn et al. | |
| 7,929,380 B2 | 4/2011 | Wei et al. | |
| 7,957,220 B2 | 6/2011 | Howlid et al. | |
| 7,974,152 B2 | 7/2011 | Tenghamn | |
| 8,050,139 B2 | 11/2011 | Berstad | |
| 8,050,867 B2 | 11/2011 | Johnson et al. | |
| 8,061,471 B2 | 11/2011 | Wei | |
| 8,079,440 B2 | 12/2011 | Laycock | |
| 8,081,540 B2 | 12/2011 | Ross | |
| 8,094,514 B2 | 1/2012 | Tenghamn | |
| 8,098,542 B2 | 1/2012 | Hillesund et al. | |
| 8,102,731 B2 | 1/2012 | Cambois | |
| 8,154,176 B2 | 4/2012 | Karakaya et al. | |
| 8,167,082 B2 | 5/2012 | Eick et al. | |
| 8,174,927 B2 | 5/2012 | Hopperstad et al. | |
| 8,189,426 B2 | 5/2012 | West et al. | |
| 8,205,711 B2 | 6/2012 | Hopperstad et al. | |
| 8,261,875 B2 | 9/2012 | Eick et al. | |
| 8,331,198 B2 | 12/2012 | Morozov et al. | |
| 8,335,127 B2 | 12/2012 | Tenghamn | |
| 8,342,288 B2 | 1/2013 | Eick et al. | |
| 8,400,872 B2 | 3/2013 | Gulgne et al. | |
| 8,427,901 B2 | 4/2013 | Lunde et al. | |
| 8,441,892 B2 | 5/2013 | Morozov et al. | |
| 8,446,798 B2 | 5/2013 | Tenghamn | |
| 8,582,395 B2 | 11/2013 | Ferber | |
| 8,630,149 B2 | 1/2014 | Thompson et al. | |
| 8,634,276 B2 | 1/2014 | Morozov et al. | |
| 8,662,243 B2 | 3/2014 | Eick et al. | |
| 8,670,292 B2 | 3/2014 | Engdahl | |
| 8,804,462 B2 | 8/2014 | Barbour et al. | |
| 8,971,152 B2 | 3/2015 | Chelminski | |
| 2006/0193203 A1 | 8/2006 | Tenghamn et al. | |
| 2008/0253226 A1 | 10/2008 | Tenghamn et al. | |
| 2009/0147626 A1 | 6/2009 | Vahida et al. | |
| 2009/0279387 A1 | 11/2009 | Tenghamn et al. | |
| 2010/0118646 A1 * | 5/2010 | Tenghamn | G01V 1/006 367/21 |
| 2010/0118647 A1 | 5/2010 | Tenghamn | |
| 2010/0322028 A1 | 12/2010 | Tenghamn | |
| 2011/0038225 A1 | 2/2011 | Tenghamn | |
| 2011/0069741 A1 | 3/2011 | Erickson | |
| 2011/0075520 A1 | 3/2011 | Gulgne et al. | |
| 2011/0085422 A1 * | 4/2011 | Thompson | G01V 1/145 367/143 |
| 2011/0090759 A1 | 4/2011 | Laycock | |
| 2011/0162906 A1 | 7/2011 | Harper | |
| 2011/0297476 A1 | 12/2011 | Harper et al. | |
| 2011/0317515 A1 * | 12/2011 | Tenghamn | G10K 9/121 367/20 |
| 2012/0075955 A1 | 3/2012 | Dean | |
| 2012/0081997 A1 | 4/2012 | Babour et al. | |
| 2012/0113747 A1 | 5/2012 | Ferber | |
| 2012/0147699 A1 | 6/2012 | Dellinger et al. | |
| 2012/0147709 A1 | 6/2012 | Zowarka, Jr. et al. | |
| 2012/0155217 A1 | 6/2012 | Dellinger et al. | |
| 2012/0188845 A1 | 7/2012 | Jeffryes | |
| 2012/0232780 A1 | 9/2012 | Delson et al. | |
| 2012/0314536 A1 | 12/2012 | Bagaini | |
| 2013/0037342 A1 | 2/2013 | Engdahl | |
| 2013/0100777 A1 * | 4/2013 | Ruet | G01V 1/005 367/141 |
| 2013/0201792 A1 * | 8/2013 | Douma | G01V 1/38 367/24 |
| 2013/0238249 A1 * | 9/2013 | Xu | G01V 1/303 702/18 |
| 2014/0238773 A1 | 8/2014 | Sallas | |
| 2014/0254313 A1 * | 9/2014 | Dowle | G01V 1/137 367/15 |
| 2014/0334254 A1 | 11/2014 | Zrostlik et al. | |
| 2014/0334259 A1 | 11/2014 | Tenghamn | |
| 2014/0340985 A1 | 11/2014 | Tenghamn et al. | |
| 2015/0085606 A1 | 3/2015 | Tenghamn et al. | |
| 2015/0085607 A1 | 3/2015 | Tenghamn | |
| 2015/0085608 A1 | 3/2015 | Tenghamn et al. | |
| 2015/0234072 A1 * | 8/2015 | McConnell | G01V 1/159 367/156 |

FOREIGN PATENT DOCUMENTS

| | | |
|---|---|---|
| RU | 2159945 C1 | 11/1999 |
| WO | 9530912 A1 | 11/1995 |
| WO | 9701770 A1 | 1/1997 |
| WO | WO9917473 | 4/1999 |
| WO | 0071266 A1 | 11/2000 |

OTHER PUBLICATIONS

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Feng et al., "A Class IV Flextensional Device Based on Electrostrictive Poly(vinylidene fluoride-trifluoroethylene Copolymer," Jun. 2003, pp. 1-6.

Ralph S. Woollett, "Underwater Helmholtz-Resonator Transducers: General Design Principles," NUSC Technical Report 5633, Jul. 5, 1977, pp. 1-48.

Rolex Spring Catalog, MW Industries, Inc., 2009.

Fons Ten Kroode et al., "Broadband seismic data—The importance of low frequencies," Geophysics, Mar.-Apr. 2013, pp. WA3-WA14, vol. 78, No. 2.

Ralph S. Woollett, "Current Approaches to the Miniaturization and Pressure Release Problems of VLF Transducers," Naval Underwater Systems Center, Nov. 5, 1973.

(56) References Cited

OTHER PUBLICATIONS

European Search report mailed Sep. 14, 2015, in the prosecution of patent application No. 14183242.8, 7 pages.
USPTO Office Action for U.S. Appl. No. 14/462,052 dated Oct. 16, 2015.
USPTO Office Action for U.S. Appl. No. 14/462,098 dated Oct. 9, 2015.
European Search Report for European Application No. EP 14 18 5770 dated Sep. 19, 2016.
Communication for European Patent Office for Application No. 14185772.2 dated May 7, 2016.
Communication for European Patent Office for Application No. 14185771.4 dated May 7, 2016.

* cited by examiner

LOW FREQUENCY MARINE ACOUSTIC VIBRATOR

CROSS-REFERENCE TO RELATED APPLICATIONS

The present application claims priority to U.S. Provisional Application No. 61/880,561, filed on Sep. 20, 2013, the entire disclosure of which is incorporated herein by reference.

BACKGROUND

Embodiments relate generally to marine seismic surveying. More particularly, embodiments relate to marine acoustic vibrators that incorporate one or more piston plates that act on the surrounding water to produce acoustic energy.

Sound sources, including marine acoustic vibrators, are generally devices that generate acoustic energy. One use of sound sources is in marine seismic surveying in which the sound sources may be employed to generate acoustic energy that travels downwardly through water and into subsurface rock. After interacting with the subsurface rock, e.g., at boundaries between different subsurface layers, some of the acoustic energy may be returned toward the water surface and detected by specialized sensors in the water, typically either on the water bottom or towed on one or more streamers. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. The frequency content of these impulsive-type sound sources typically in use today is controllable only to a small degree. As a result, different sound sources may be selected for the generation of different frequency ranges based on the surveying needs. Notably, these impulsive-type sources also have limited acoustic energy output in the very low frequency band from 1-10 Hz. However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than higher frequency sound waves. Thus, efforts have been undertaken to develop sound sources that can operate at low frequencies.

BRIEF DESCRIPTION OF THE DRAWINGS

These drawings illustrate certain aspects of some of the embodiments of the present invention and should not be used to limit or define the invention.

DETAILED DESCRIPTION

Figure 1:
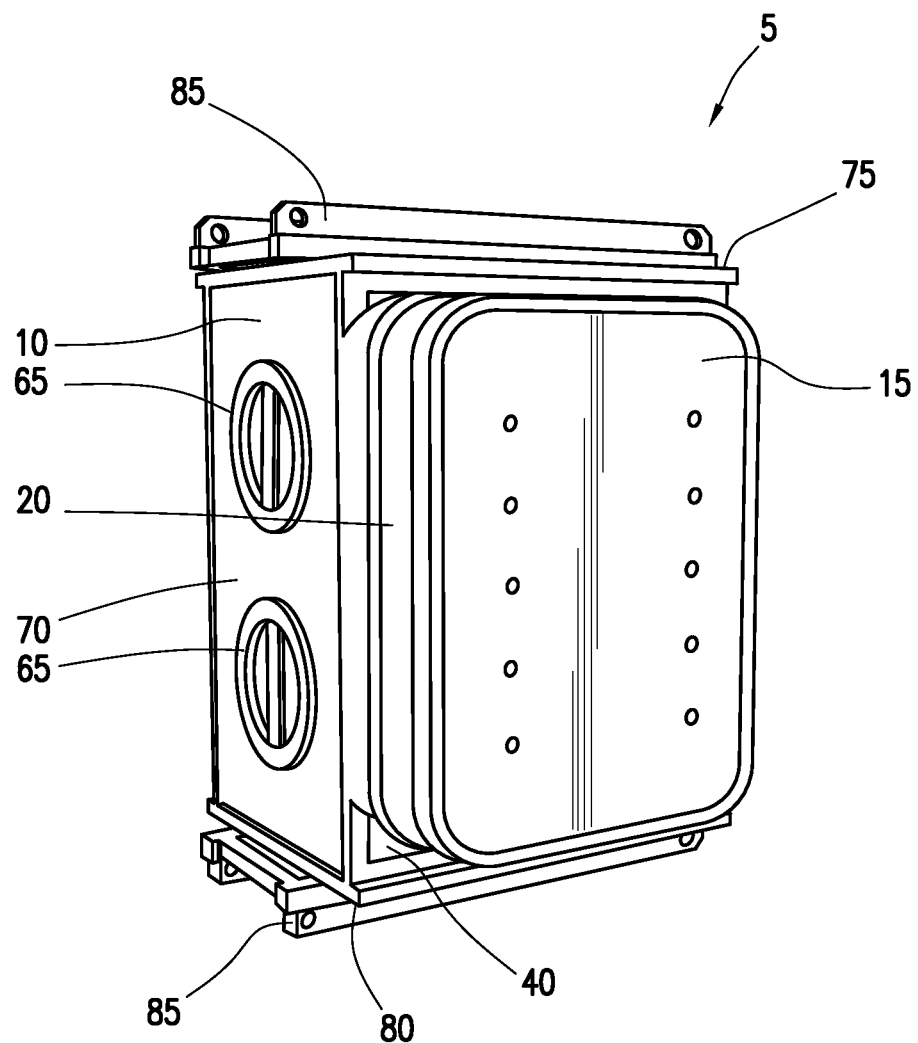
FIG. 1 illustrates one embodiment of a marine acoustic vibrator.

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine acoustic vibrators that incorporate one or more piston plates that may act on the surrounding water to produce acoustic energy. The marine acoustic vibrators may further comprise one or more drivers coupled to the piston plates to cause the piston plates to move back and forth. The marine acoustic vibrators may also include one or more springs coupled between the piston plates and a fixture in the vibrators. Advantageously, the marine acoustic vibrators may display a low resonance frequency in the seismic frequency range of interest. In particular embodiments, the marine acoustic vibrator may display at least one resonance frequency (when submerged in water at a depth of from about 0 meters to about 300 meters) in the seismic frequency range of interest between about 1 Hz to about 200 Hz. In alternative embodiments, the marine acoustic vibrator may display at least one resonance frequency (when submerged in water at a depth of from about 0 meters to about 300 meters) between about 0.1 Hz and about 100 Hz and, alternatively, between about 0.1 Hz and about 10 Hz. In some embodiment, the marine acoustic vibrator may display at least two resonance frequencies of about 10 Hz or lower (when submerged in water at a depth of from about 0 meters to about 300 meters).

An embodiment may provide a marine acoustic vibrator comprising: a containment housing; a piston plate; a fixture coupled to the containment housing; a spring element coupled to the piston plate and the fixture; and a driver coupled to the piston plate and the fixture and configured to move the piston plate back and forth.

Another embodiment may provide a marine acoustic vibrator comprising a containment housing and a fixture coupled to the containment housing. The marine acoustic vibrator may further comprise a first piston plate coupled to the housing. The marine acoustic vibrator may further comprise a first driver disposed within the marine acoustic vibrator, the first driver being coupled to the fixture and the first piston plate, wherein the first driver is configured to move the first piston plate back and forth. The marine acoustic vibrator may further comprise a first pair of spring elements coupled to the first piston plate and the fixture, wherein the first pair of spring elements are positioned on opposite sides of the first driver from one another. The marine acoustic vibrator may further comprise a second piston plate coupled to the housing opposite the first piston plate. The marine acoustic vibrator may further comprise a second driver disposed within the marine acoustic vibrator, the second driver being coupled to the fixture and the second piston plate, wherein the second driver is configured to move the second piston plate back and forth. The marine acoustic vibrator may further comprise a second pair of spring elements coupled to the second piston plate and the fixture, wherein the second pair of spring elements are positioned on opposite sides of the second driver from one another.

Yet another embodiment may provide a method comprising: towing a marine acoustic vibrator in a body of water in conjunction with a marine seismic survey; and triggering the marine acoustic vibrator to cause one or more piston plates in the marine acoustic vibrator to move back and forth wherein one or more spring elements exert a biasing force against the one or more piston plates, the spring elements being coupled to the one or more piston plates and a fixture in the marine acoustic vibrator.

In order to appreciate the exemplary marine acoustic vibrators discussed herein, a discussion of how such marine acoustic vibrators may be able to efficiently transmit acoustic energy is initially presented. As would be understood by one of ordinary skill in the art, the total impedance that may be experienced by a marine acoustic vibrator may be expressed as follows:

$$Z_r = R_r + jX_r \quad \text{(Eq. 1)}$$

where $Z_r$ is total impedance, $R_r$ is radiation impedance, and $X_r$ is reactive impedance.

In an analysis of the energy transfer of a marine acoustic vibrator, the system may be approximated as a baffled piston. In the expression of the total impedance that will be experienced, the radiation impedance $R_r$ of a baffled piston may be:

$$R_r = \pi a^2 \rho_o c R_1(x) \quad \text{(Eq. 2)}$$

and the reactive impedance may be:

$$X_r = \pi a^2 \rho_o c X_1(x) \quad \text{(Eq. 3)}$$

where $$x = 2ka = (4\pi a/\lambda) = (2\omega a/c) \quad \text{(Eq. 4)}$$

and where $$R_1(x) = 1 - (2/x)J_1(x) \text{ and} \quad \text{(Eq. 5)}$$

-continued $$X_1(x) = \left(\frac{4}{\pi}\right)\int_0^{\pi/2} \sin(x\cos\alpha)\sin^2\alpha\, d\alpha \quad \text{(Eq. 6)}$$

where $\rho_o$=density of water, $\omega$=radial frequency, k=wave number, a=radius of piston, c=sound velocity, $\lambda$=wave length, and $J_1$=Bessel function of the first order.

Using the Taylor series expansion on the above equations yields the following:

$$R_1(x) = \frac{x^2}{2^2 1!2!} - \frac{x^4}{2^4 2!3!} + \cdots \quad \text{(Eq. 7)}$$

$$X_1(x) = \frac{4}{\pi}\left(\frac{x}{3} - \frac{x^3}{3^2 5} + \frac{x^5}{3^2 5^2 7} - \cdots\right) \quad \text{(Eq. 8)}$$

For low frequencies, when x=2ka is much smaller than 1, the real and imaginary part of the total impedance expression may be approximated with the first term of the Taylor expression. The expressions for low frequencies, when the wave length is much larger than the radius of the piston becomes:

$$R_1(x) \to (\tfrac{1}{2})(ka)^2 \quad \text{(Eq. 9)}$$

$$X_1(x) \to (8ka)/(3\pi) \quad \text{(Eq. 10)}$$

It follows that, for low frequencies, R will be a small number compared to X, which suggests a very low efficiency signal generation. However, embodiments may introduce a resonance in the lower end of the frequency spectrum so that low frequency acoustic energy may be generated more efficiently. By way of example, embodiments of the marine acoustic vibrators may display at least one resonance frequency within the seismic frequency range of about 1 Hz to about 10 Hz. At resonance, the imaginary (reactive) part of the impedance is cancelled, and the marine acoustic vibrator may be able to efficiently transmit acoustic energy into the body of water.

Figure 2:
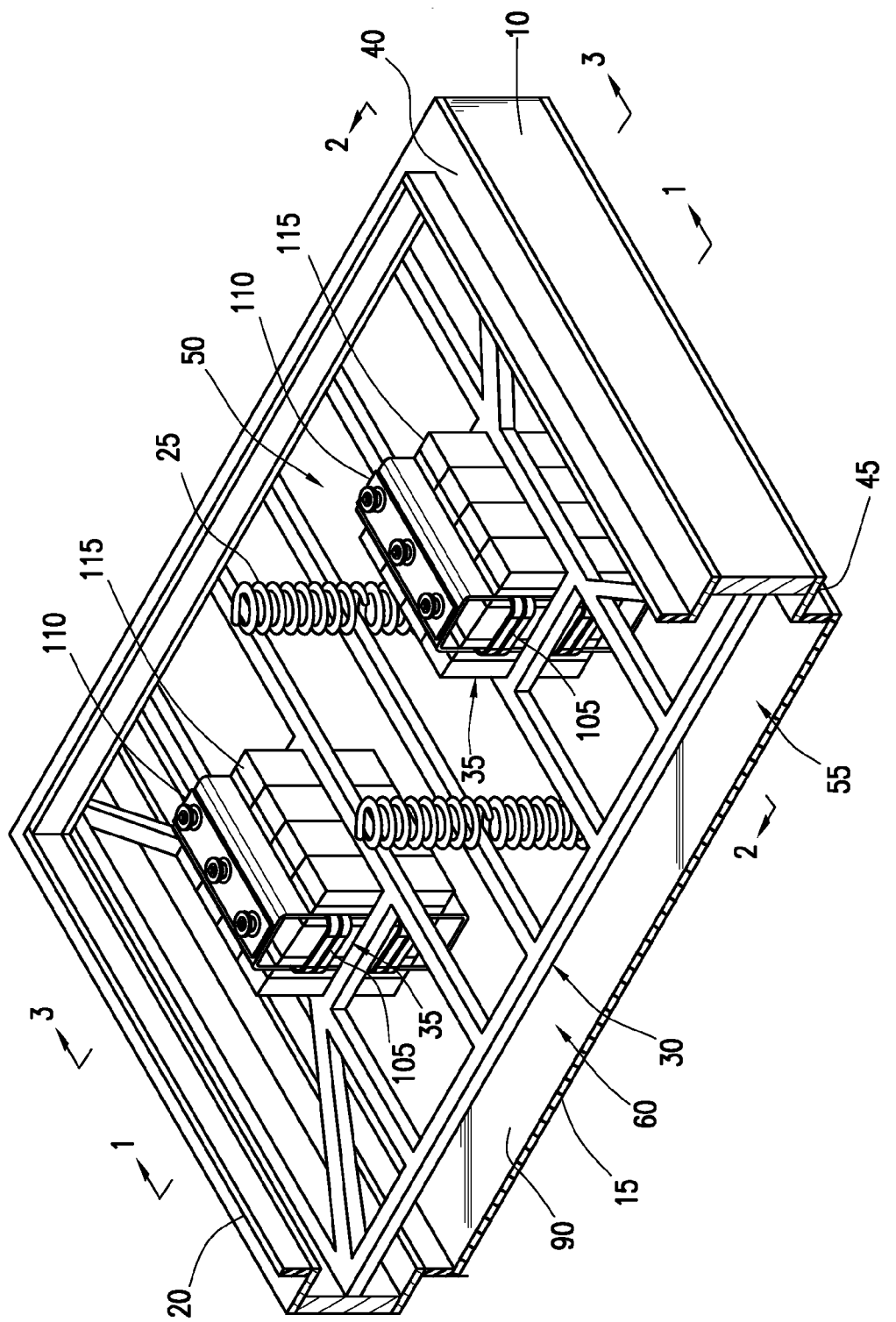
FIG. 2 illustrates a partial cross-sectional view of the marine acoustic vibrator of FIG. 1.
Figure 3:
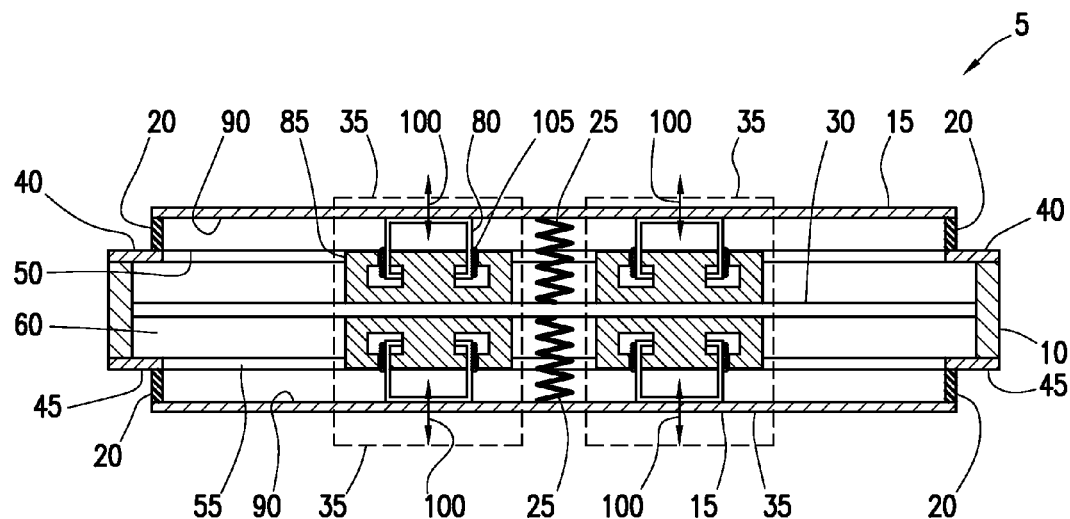
FIG. 3 illustrates a cross-sectional view of the marine acoustic vibrator of FIGS. 1 and 2 taken along line 1-1 of FIG. 2.
Figure 4:
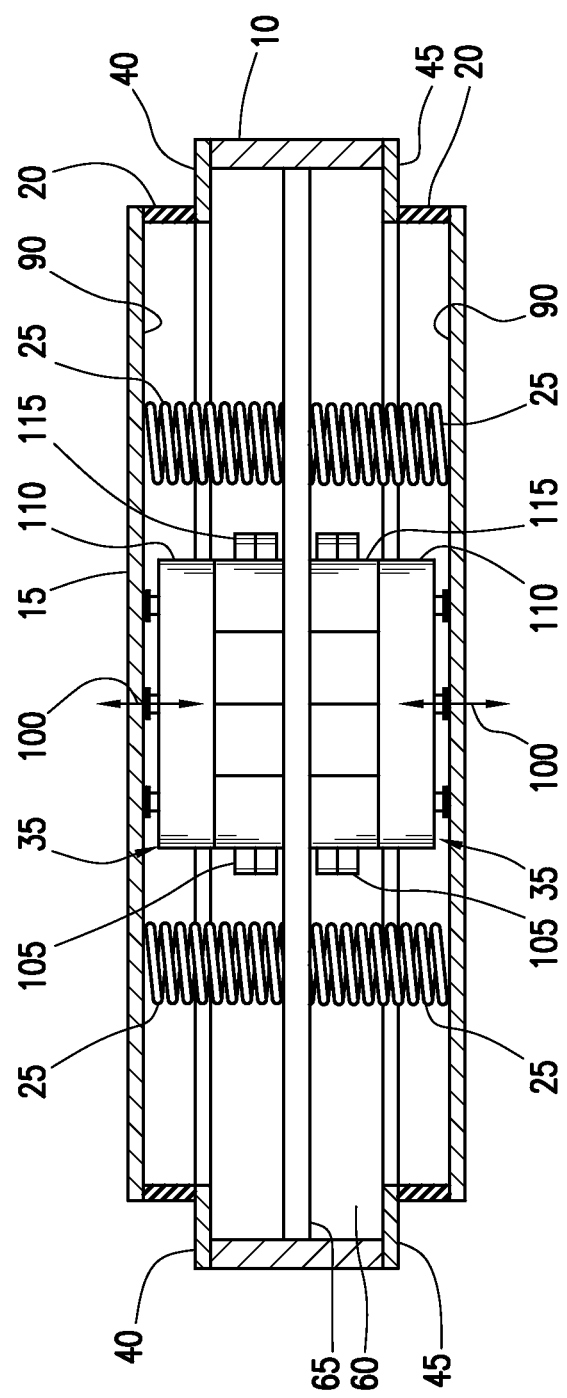
FIG. 4 illustrates a cross-sectional view of the marine acoustic vibrator of FIGS. 1 and 2 taken along line 2-2 of FIG. 2.

Turning now to FIGS. 1-4, an embodiment of a marine acoustic vibrator 5 will be described. FIG. 1 is a perspective view of an embodiment of the marine acoustic vibrator 5. FIG. 2 is a partial cross-sectional view in perspective of the marine acoustic vibrator 5 of FIG. 1 with one of the piston plates 15 removed. FIG. 3 is a cross-sectional view of the marine acoustic vibrator 5 of FIGS. 1 and 2 taken along line 1-1. FIG. 4 is a cross-sectional view of the marine acoustic vibrator 5 of FIGS. 1 and 2 taken along line 2-2.

In the illustrated embodiment, the marine acoustic vibrator 5 includes a containment housing 10. Piston plates 15 may be flexibly coupled to the containment housing 10, for example, by way of rubber seals 20. As best seen on FIGS. 3 and 4, the piston plates 15 may each have spring elements 25 attached to them. The spring elements 25 may be disposed between the piston plates 15 and a fixture 30. One or more drivers 35 may be coupled to the piston plates 15 and the fixture 30 to cause the piston plates 15 to move back and forth. This motion of the piston plates 15 takes advantage of the flexibility of the rubber seals 20. As would be understood by one of ordinary skill in the art with the benefit of this disclosure, the rubber seals 20 do not need to be made of rubber, but rather could be made from any material that allows a flexible coupling of the piston plates 15 to the containment housing 10 as further discussed below.

The containment housing 10 may have a first surface 40 and a second surface 45, which may be opposing one another. As best seen on FIGS. 2-4, windows or openings 50 and 55 may be formed respectively in the first surface 40 and the second surface 45. While not illustrated, embodiments may include windows or openings 50, 55 that are larger or smaller than the piston plates 15. The containment housing 10 together with the piston plates 15 may at least partially define an interior volume 60 of the marine acoustic vibrator 5. In some embodiments, the spring elements 25 and/or drivers 35 may be at least partially disposed in the interior volume 60 of the marine acoustic vibrator 5. By way of example, a portion of the spring elements 25 and/or drivers 35 may be disposed outside the interior volume 60 of the marine acoustic vibrator. In alternative embodiments, the spring elements 25 and/or drivers 35 may be entirely disposed within the interior volume 60. While not illustrated, the spring elements 25 may be disposed outside the interior volume 60 so long as the spring elements 25 are coupled to the fixture 30. In some embodiments, the marine acoustic vibrator 5 may be pressure compensated such that the pressure of the interior volume 60 may be kept the same as the external pressure (i.e., the pressure on the side of the piston plates 15 opposite that of the interior volume 60), thus enabling operation at increased depth, for example, up to about 300 meters or more. The containment housing 10 together with the piston plates 15 and the rubber seals 20 may form a waterproof housing for the other components of the marine acoustic vibrator 5, such as the spring elements 25 and drivers 35. The containment housing 10 may be constructed from any suitable material, including, without limitation, steel (e.g., stainless steel), aluminum, a copper alloy, glass-fiber reinforced plastic (e.g., glass-fiber reinforced epoxy), carbon fiber reinforced plastic, and combinations thereof. Similarly, the containment housing 10 as best seen in FIGS. 1 and 2 may have the general shape of a rectangular box. It should be understood that other configurations of the containment housing 10 may be suitable, including those having the general shape of a square box or other suitable shapes.

In some embodiments, the containment housing 10 may further include optional caps 65, which may be disposed in a lateral side 70 of the containment housing 10, as shown on FIG. 1. In particular embodiments, one or more of the caps 65 may be removable. By way of example, the caps 65 may facilitate attachment of a device, such as a compliance chamber, to the containment housing 10. As further illustrated by FIG. 1, the containment housing 10 may include first and second ends 75, 80 to which brackets 85 may be separately mounted. The brackets 85 may be used for hoisting marine acoustic vibrator 5, for example when deploying the marine acoustic vibrator 5 in the water. By way of example, the brackets 85 may facilitate attachment of the marine acoustic vibrator 5 to tow lines, a submersible vessel (e.g., submersible vessel 165 on FIG. 9), or other suitable device or mechanism used in conjunction with towing the marine acoustic vibrator 5 through a body of water.

Figure 5:
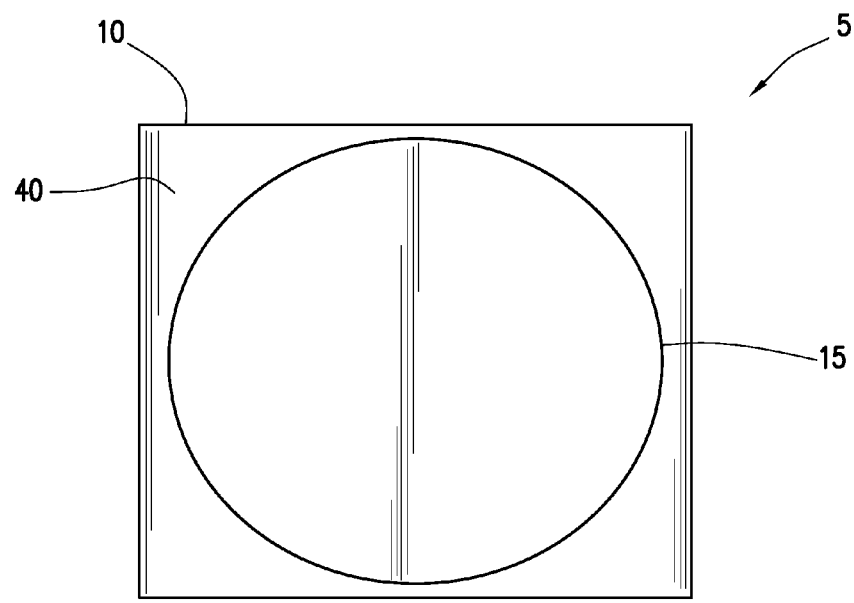
FIG. 5 illustrates another embodiment of a marine acoustic vibrator.

The piston plates 15 may typically be constructed of a material that will not bend or flex when in use. By way of example, the piston plates 15 may comprise, without limitation, steel (e.g., stainless steel), aluminum, a copper alloy, glass-fiber reinforced plastic (e.g., glass-fiber reinforced epoxy), carbon fiber reinforced plastic, and combinations thereof. In some embodiments, the piston plates 15 may be substantially rectangular in shape. By way of example, the piston plate 15 shown on FIG. 1 is rectangular in shape except with rounded corners. In some embodiments, the piston plates 15 may be in the form of flat, circular disks (as best seen in FIG. 5). By way of example, the piston plates 15 may each be a flat, circular disk having substantially uniform thickness. However, other configurations, including both axially-symmetric and not, of the piston plates 15 may be suitable for particular applications. By way of example, the piston plates 15 may be square, elliptical, or other suitable shape for providing the desired acoustic energy. In alternative embodiments, the piston plates 15 may be curved, either convexly protruding into interior volume 60, or concavely extending interior volume 60. In general, the piston plates 15 have a thickness that provides stiffness and also withstands expected pressures. As will be appreciated by those of ordinary skill in the art with the benefit of this disclosure, the plate thickness may vary based on the material of construction, among other factors. As will be discussed in more detail below, the mass load of the piston plates 15 and the spring constant of the spring elements 25 may be selected (i.e., tuned) in a manner to produce a first resonance frequency within the seismic frequency range of interest when the marine acoustic vibrator 5 is submerged in water at a depth of from about 0 meters to about 300 meters. While a single one of the piston plates 15 is illustrated on either side of the fixture 30, embodiments may include multiple piston plates 15 on either side of the fixture 30. Moreover, embodiments may include piston plates 15 that are smaller in size with respect to the containment housing 10 as compared to those illustrated on FIGS. 1-4.

With continued reference to FIGS. 1-4, the piston plates 15 may each be secured to the containment housing 10 in a manner that allows movement of the piston plates 15 relative to the containment housing 10 with substantially no bending or flexing of the piston plates 15 during operation of the marine acoustic vibrator 5. In the embodiment of FIG. 1, a pair of piston plates 15 is shown. One of the piston plates 15 may be disposed on one side of the containment housing 10 while the other of the piston plates 15 may be disposed on the opposing side of the containment housing 10. As illustrated, one of the piston plates 15 may be coupled to the containment housing 10 at or near the first surface 40 and the other piston plate 15 may be coupled to the second surface 45. The piston plates 15 may each cover a corresponding one of the openings 50, 55 in the respective first and second surfaces 40, 45 of the containment housing 10. In the illustrated embodiment, the piston plates 15 are coupled to the containment housing 10 by way of rubber seals 20. The rubber seals 20 may not hold the piston plates 15 in place but rather may flex (or otherwise move) to permit movement of the piston plates 15 at their outer edges. In particular embodiments, the piston plates 15 may function as piston transducers, wherein each of the piston plates 15 moves back forth by actuation of the drivers 35. Movement of the pistons plates 15 is illustrated on FIGS. 3 and 4 by arrows 100. In contrast to flextensional-shell type vibrators, the piston plates 15 may not bend or flex in operation, but rather may move back and forth acting against the surrounding water.

In the illustrated embodiment, spring elements 25 (e.g., in the form of coil springs) are disposed in the marine acoustic vibrator 5 on either side of the fixture 30. However As best seen in FIG. 4, pairs of spring elements 25 may be located on either side of the fixture 30 with a first pair of spring elements 25 disposed on one side of the containment housing 10 and a second pair of the spring elements 25 disposed on the opposing side of the containment housing 10. The spring elements 25 in the first pair may be disposed on opposite sides of the drivers 35 from one another, and the spring elements 25 in the second pair may also be disposed on opposite sides of the drivers 35 from one another. The spring elements 25 may each extend between a corresponding one of the piston plates 15 and the fixture 30. The spring elements 25 may be coupled to the piston plates 15 and the fixture 30 to exert a biasing action on the piston plates 15. A wide variety of different spring elements 25 may be used that are suitable for exerting the desired biasing action against the piston plates 15, including both linear and non-linear springs. In particular embodiments, the spring elements 25 may be any of a variety of different types of springs, including compression springs, torsion springs, or other suitable springs for exerting the desired biasing action. Specific examples of spring elements 25 that may be used include coil springs, flat springs, bow springs, and leaf springs, among others. Suitable spring elements 25 may be constructed from spring steel or other suitable resilient material, such as glass-fiber reinforced plastic (e.g., glass-fiber reinforced epoxy), carbon fiber reinforced plastic, and combinations thereof. In some embodiments, the dimensions, material make-up, and shape of the spring elements 25 may be selected to provide a sufficient spring constant for vibrations within the seismic frequency range of interest when the marine acoustic vibrator 5 is submerged in water at a depth of from about 0 meters to about 300 meters.

Drivers 35 may be one of a variety of types of drivers, for example electro-dynamic drivers. In some embodiments, the drivers 35 may be "moving coil" or "voice coil" drivers, which may provide the ability to generate very large acoustic energy amplitudes. Other types of drivers 35 may also be used, such as linear servo motors. Although the particular embodiment described herein shows four uni-directional drivers utilized in parallel, embodiments in which one or more bi-directional drivers, embodiments with one or more uni-directional drivers, or embodiments in which more or less than four uni-directional drivers are utilized, are each within the scope of the invention. As best seen in FIGS. 3 and 4, a pair of the drivers 35 may be coupled to an interior face 90 of one of the piston plates 15 on one side of the containment housing 10 while another pair of the drivers 35 may be coupled to an interior face 90 of another one of the piston plates 15 on an opposing side of the containment housing. The drivers 35 may also be coupled to the fixture 30 and disposed within the marine acoustic vibrator 5.

As illustrated, the drivers 35 may each comprise a uni-directional, moving coil driver, comprising an electric coil 105, transmission element 110, and magnetic circuitry 115, which may work together to generate a magnetic field. As illustrated, the magnetic circuitry 115 may be connected to the fixture 30, while the transmission element 110 may connect to the corresponding piston plate 15. In some embodiments (not illustrated), this arrangement may be reversed (i.e., the magnetic circuitry 115 connects to the corresponding piston plate 15, while the transmission element 110 connects to the fixture 30). As illustrated, each transmission element 110 may transfer motion of the corresponding electric coil 105 to the interior face 90 of the corresponding piston plate 15. When electrical current I is applied to the electric coil 105, a force F acting on the electric coil 105 may be generated as follows:

$$F = IlB \quad \text{(Eq. 11)}$$

Where I is the current, l is the length of the conductor in the electric coil 105, and B is the magnetic flux generated by the magnetic circuitry 115. By varying the magnitude of the electrical current and consequently the magnitude of the force acting on the electric coil 105, the length of the driver stroke may vary. Each driver 35 may provide stroke lengths of several inches—up to and including about 10"—which may allow the marine acoustic vibrator 5 to generate enhanced amplitude acoustic energy output in the low frequency ranges, for example, between about 1 Hz and about 10 Hz when the marine acoustic vibrator 5 is submerged in water at a depth of from about 0 meters to about 300 meters. Often, the magnetic circuitry 115 may comprise permanent magnets, though any device capable of generating a magnetic flux may be incorporated.

In some embodiments, the fixture 30 suspends the drivers 35 within the containment housing 10. For example, in the illustrated embodiment, the fixture 30 extends along the major axis of containment housing 10 and may be coupled to either end of the containment housing 10. The fixture 30 may be circular, square, rectangular, or other suitable cross-section as desired for a particular application. An example of a suitable fixture 30 may include a rod, beam, plate, or other suitable frame for supporting internal components such as the drivers 35 in the containment housing 10. In particular embodiments, the fixture 30 may be fixed to the containment housing 10 in a manner that prevents movement to prevent undesired contraction of the major axis of the containment housing 10. In particular embodiments, the piston plates 15 may work in symmetry above and below the fixture 30. In other words, in some embodiments, the fixture 30 may divide the marine acoustic vibrator 5 into symmetrical halves with respect to at least the piston plates 15, spring elements 25, and drivers 35.

Turning now to FIG. 5, a diagram illustrating another embodiment of a marine acoustic vibrator 5 is shown. As illustrated, the marine acoustic vibrator 5 may comprise a containment housing 10, which may have a first surface 40. The piston plate 15 may be indirectly coupled to the first surface of the containment housing 10. While not shown on FIG. 5, a rubber seal (e.g., rubber seal 20 on FIG. 1) may couple the piston plate 15 to the first surface 40 of the containment housing 10. As illustrated, in some embodiments, the piston plate 15 may be substantially circular in shape while, in other embodiments, the piston plate 15 may have a different shape, such as a substantially square or rectangular shape in one embodiment. Similarly, while the containment housing 10 is depicted on FIG. 5 as having a generally square-shaped first surface 40, the containment housing 10 may have other suitable configurations for the first surface 40, including substantially, rectangular, circular, or rounded.

Figure 6:
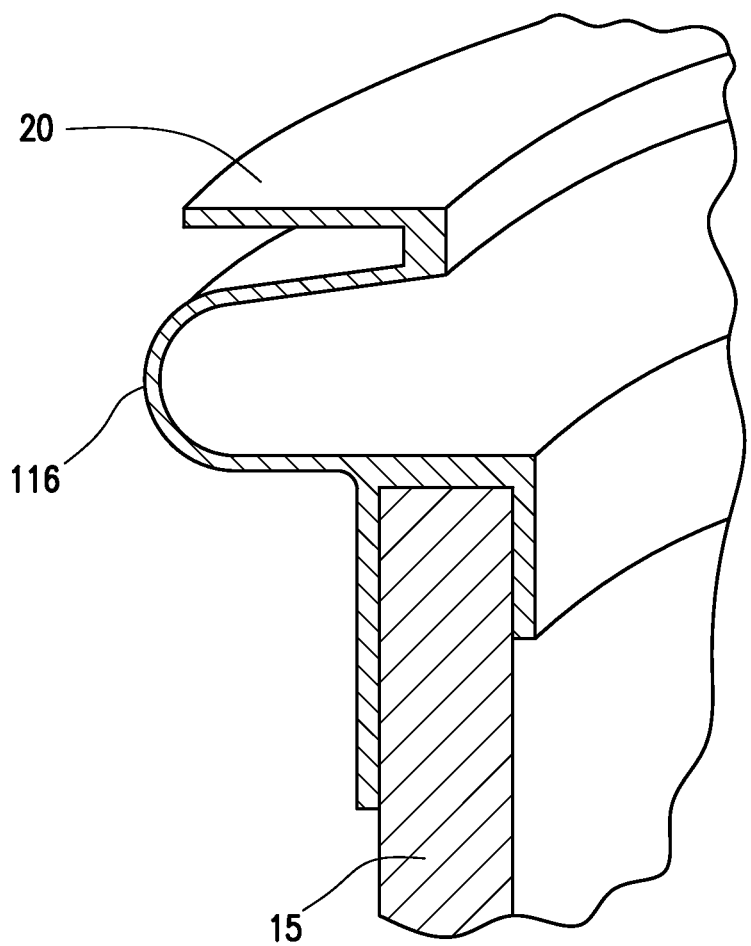
FIG. 6 illustrates one embodiment of a rubber seal used with a marine acoustic vibrator.

Turning now to FIG. 6, an embodiment of the rubber seal 20 is depicted. In the illustrated embodiment, coupling of the rubber seal 20 to a piston plate 15 is shown. While not shown, the rubber seal 20 may also be coupled to the containment housing 10, for example, to form a water-tight seal between the piston plate 15 and the containment housing 10. In general, the rubber seal 20 may be configured to allow movement of the piston plate 15 while also maintaining the appropriate seal. As illustrated, the rubber seal 20 may have significant curvature (e.g., curved portion 116) to permit a significant amplitude of movement. By way of example, this permitted movement may further enable the piston plates 15 to have several inches of travel, e.g., the piston plates 15 may move back and forth relative to containment housing 10 a distance of from about 1 inch to about 10 inches (or more). While FIG. 6, illustrates the rubber seal 20 with the curved portion 115 to permit movement, other techniques for permitting movement may be used, including use of seals with a bellows or accordion-type configuration. Moreover, while preceding description describes use of rubber, other materials of construction may be used in coupling the piston plates 15 to the containment housing 10 that can provide the desired seal and movement.

Figure 7:
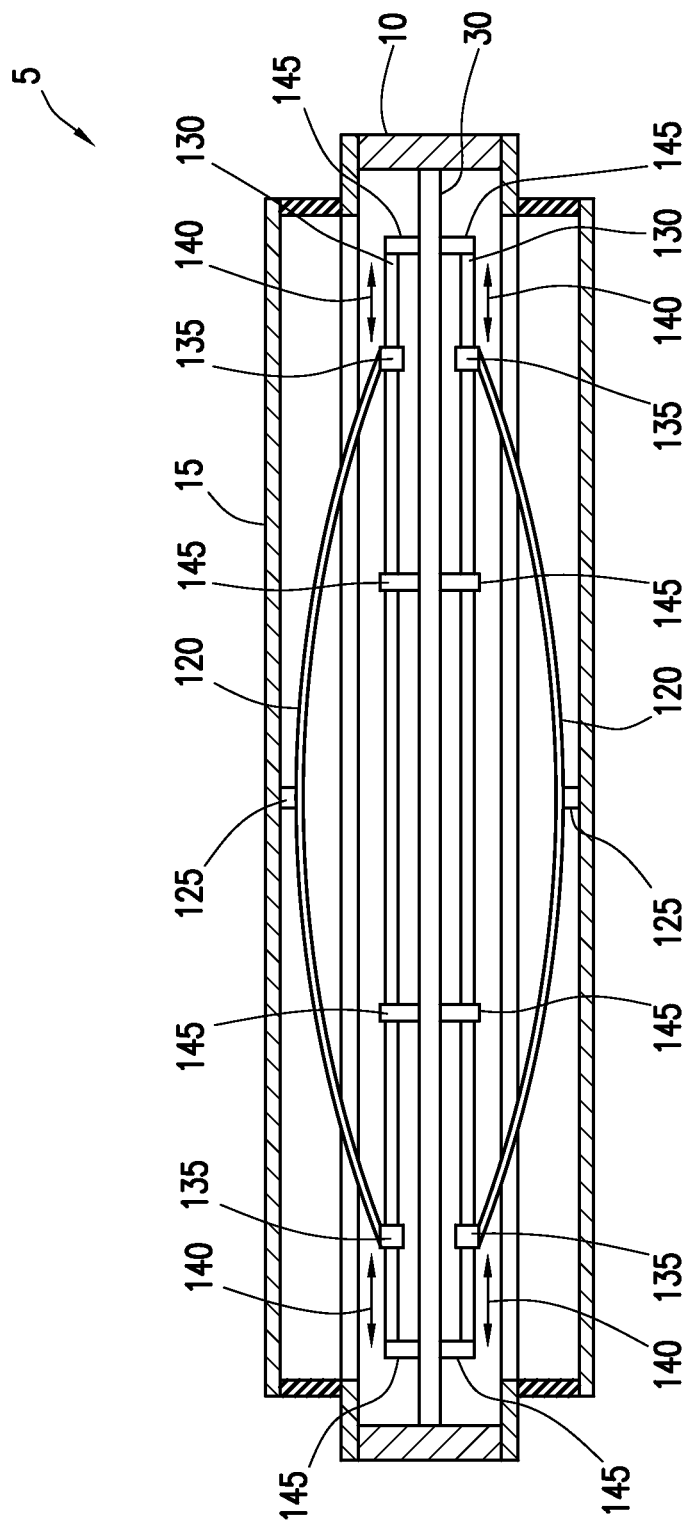
FIG. 7 illustrates a cross-sectional view of an embodiment of a marine acoustic vibrator with an alternative embodiment of a mechanical spring element taken along line 3-3 of FIG. 2.

Turning now to FIG. 7, a cross-sectional view of one embodiment of the marine acoustic vibrator 5 is provided that includes alternative spring elements 120. The cross-sectional view is taken along line 3-3 of FIG. 2. In contrast to FIG. 2 which illustrates spring elements 25 in the form of coil springs, FIG. 7 illustrates the alternative spring elements 120 in the form of bow springs. In the cross-sectional view of FIG. 7, certain elements of the marine acoustic vibrator such as the drivers 35 are not visible.

The following description is for one of the alternative spring elements 120; however, because the fixture 30 provides a line of symmetry, this description is equally applicable to both of the alternative spring elements 120. As illustrated, one of the alternative spring element 120 may be coupled between one of the piston plate 15 and the fixture 30 one side of the containment housing 10. The alternative spring element 120 may be coupled to the piston plate 15 at attachment point 125, which may be a fixed connection, for example, that does not permit movement. The alternative spring element 120 may be coupled on either end to a supplemental fixture 130, which may be in the form of a beam, rod, plate, or other suitable frame for supporting the alternative spring element 120 in the containment housing 10. The alternative spring element 120 may be coupled to the supplemental fixture 130 by way of bearings 135. In particular embodiments, the bearings 135 may permit movement of the spring element 120, for example, linear bearings that permit linear movement of the ends of alternative spring element 120 as represented by arrows 140. In this manner, the alternative spring element 120 may be allowed to flex and provide a biasing force to the piston plate 15 upon its movement. The supplemental fixture 130 may be coupled to the fixture 30 at one or more fixture attachment points 145, which may be fixed connections that do not permit movement.

Figure 8:
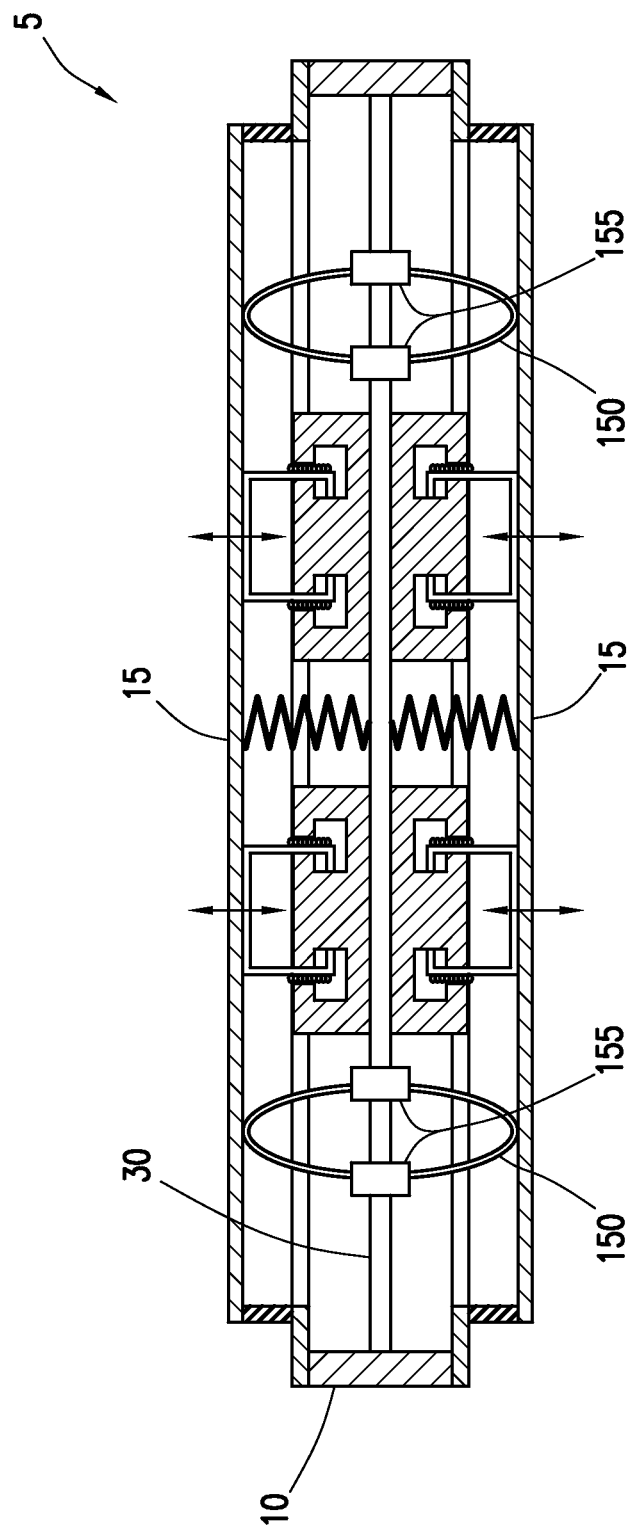
FIG. 8 illustrates another embodiment of a marine acoustic vibrator.

Turning now to FIG. 8, another embodiment of a marine acoustic vibrator 5 is illustrated. In the illustrated embodiment, the marine acoustic vibrator 5 further includes mass springs 150 with weights 155 affixed thereto. The mass springs 150 shown on FIG. 7 may also be used in conjunction with the alternative spring elements 120 shown on FIG. 6 (or other suitable type of spring element). As illustrated, the mass springs 150 may be coupled between the fixture 30 and the piston plates 15. In the illustrated embodiment, a pair of mass springs 150 is shown on either side of the fixture 30 so that the marine acoustic vibrator 5 comprises four mass springs 150. However, it should be understood that more or less than four mass springs 150 may be utilized for a particular application. As will be described below, in various embodiments, the spring constant of the mass springs 150 and the mass of the weights 155 may be selected in a manner to achieve a second system resonance frequency within the seismic frequency range of interest when the marine acoustic vibrator 5 is submerged in water at a depth of from about 0 meters to about 300 meters. In a particular embodiment, the marine acoustic vibrator 5 may exhibit a first resonance frequency of about 2.5 Hz and a second resonance frequency of about 4.5 Hz when submerged in water at a depth of from about 0 meters to about 300 meters Although a marine acoustic vibrator 5 as shown in FIG. 1 that did not include the mass springs 150 would typically display a second resonance frequency, for systems having a size suitable for use in geophysical exploration, the second resonance frequency when the marine acoustic vibrator 5 shown on FIG. 1 is submerged in water at a depth of from about 0 meters to about 300 meters would typically be much higher than the frequencies within the seismic frequency range of interest.

In various embodiments, finite element analysis may be utilized in order to appropriately tune the piston plates 15, spring elements 25 (or alternative spring elements 120), mass springs 150, and weights 155. In such an analysis the following principles of operation may be relevant. With the piston plate 15, then, for low frequencies, the mass load, or the equivalent fluid mass acting on the piston plate 15 is:

$$M_{piston\_plate} = \rho_o(8a^3/3) \qquad (\text{Eq. 11})$$

where $M_{piston\_plate}$ is the mass load acting on the piston plate 15, $\rho_o$ is the density of water surrounding the marine acoustic vibrator, and a is the equivalent radius for the piston plate 15 which corresponds to the size of the piston plate 15.

The spring elements 25 (or alternative spring elements 120) may also have a spring constant ($K_{piston\_spring}$) in the direction of the moving electric coils (e.g., electric coil 105 on FIGS. 2-4). Therefore, the first resonance ($f_{resonance-1}$) of the marine acoustic vibrator 5, due to interaction of the piston plates 15 and the spring elements 25 (or alternative spring elements 120) with the water, may be substantially determined by the following mass spring relationship:

$$f_{resonance-1} = \frac{1}{2\pi}\sqrt{\frac{K_{piston\_spring}}{M_{piston\_plate}}} \qquad (\text{Eq. 12})$$

where $K_{piston\_spring}$ is the spring constant of a spring elements 25 (or alternative spring elements 120), and $M_{piston\_plate}$ is the mass load acting on the piston plate 15.

To achieve efficient energy transmission in the seismic frequency range of interest, it may be desirable to achieve a second resonance frequency within the seismic frequency range of interest. In the absence of the mass springs 150, the second resonance frequency would occur when the piston plate 15 has its second Eigen-mode. This resonance frequency, however, is normally much higher than the first resonance frequency, and accordingly, would typically be outside the seismic frequency range of interest. As is evident from the foregoing equation, the resonance frequency will be reduced if the mass load on the piston plates 15 is increased. However, in some embodiments, in order to add sufficient mass to achieve a second resonance frequency within the seismic frequency range of interest, the amount of mass that would need to be added to the piston plates 15 may make such a system less practical for use in marine seismic surveying operations Thus, in some embodiments, the mass springs 150 may be included inside the containment housing 10 with the weights 155 on the side of the mass springs 150. In one embodiment, these mass springs 150 may have a transformation factor $T_{mass\_spring}$ between the long and short axis of its ellipse, so that the deflection of the two side portions will have a higher amplitude than the deflection of end attached to the piston plate 15 and electric coil.

The effect of such mass springs 150 may be equivalent to adding mass in the end of the drivers 35 where it is attached to the piston plates 15.

$$M_{mass\_spring} = (T_{mass\_spring})^2 \cdot M_{added} \qquad (\text{Eq. 13})$$

Wherein $M_{mass\_spring}$ is the mass of the mass springs 150, $T_{mass\_spring}$ is the transformation factor of the mass springs 150, and $M_{added}$ is the mass of the weights 155.

Use of the mass springs 155, may allow the second resonance frequency of the system to be tuned so that the second resonance frequency is within the seismic frequency range of interest, thereby improving the efficiency of the marine acoustic vibrator 5 in the seismic frequency range of interest.

$$f_{resonance2} = \frac{1}{2\pi}\sqrt{\frac{K_{mass\_spring} + K_{piston\_spring}}{(T_{spring})^2 \cdot M_{added} + M_{piston\_plate}}} \quad \text{(Eq. 14)}$$

where $K_{mass\_spring}$ is the spring constant of mass springs 150, $K_{piston\_spring}$ is the spring constant of spring elements 25 (or alternative spring element 120), $T_{mass\_spring}$ is the transformation factor of the mass springs 150, $M_{added}$ is the mass of the weights 155, and $M_{piston\_plate}$ is the mass load on the piston plates 15.

Accordingly, it may be possible, as shown above, to select the weights 155 on the mass springs 150 to tune the second resonance frequency. It may also be possible to select the extent of influence the second resonance frequency may have on the system. By way of example, if the mass springs 150 have a low spring constant compared to the spring elements 25 (or alternative spring elements 120), and a matching of weights 155 is added to the mass springs 150, the mass springs 150 will function relatively independently from the piston plates 15. In such cases, the second resonance frequency may be as follows:

$$f_{resonance2} = \frac{1}{2\pi}\sqrt{\frac{K_{mass\_spring}}{(T_{mass\_spring})^2 \cdot M_{added}}} \quad \text{(Eq. 15)}$$

In the same way, it may also be possible in some embodiments to make the second resonance frequency very large by selecting a high spring constant for the mass springs 150 (e.g., stiffer mass springs 150) with a matching of weights 155 such that the second resonance frequency will have a larger amplitude than the first resonance frequency.

Figure 9:
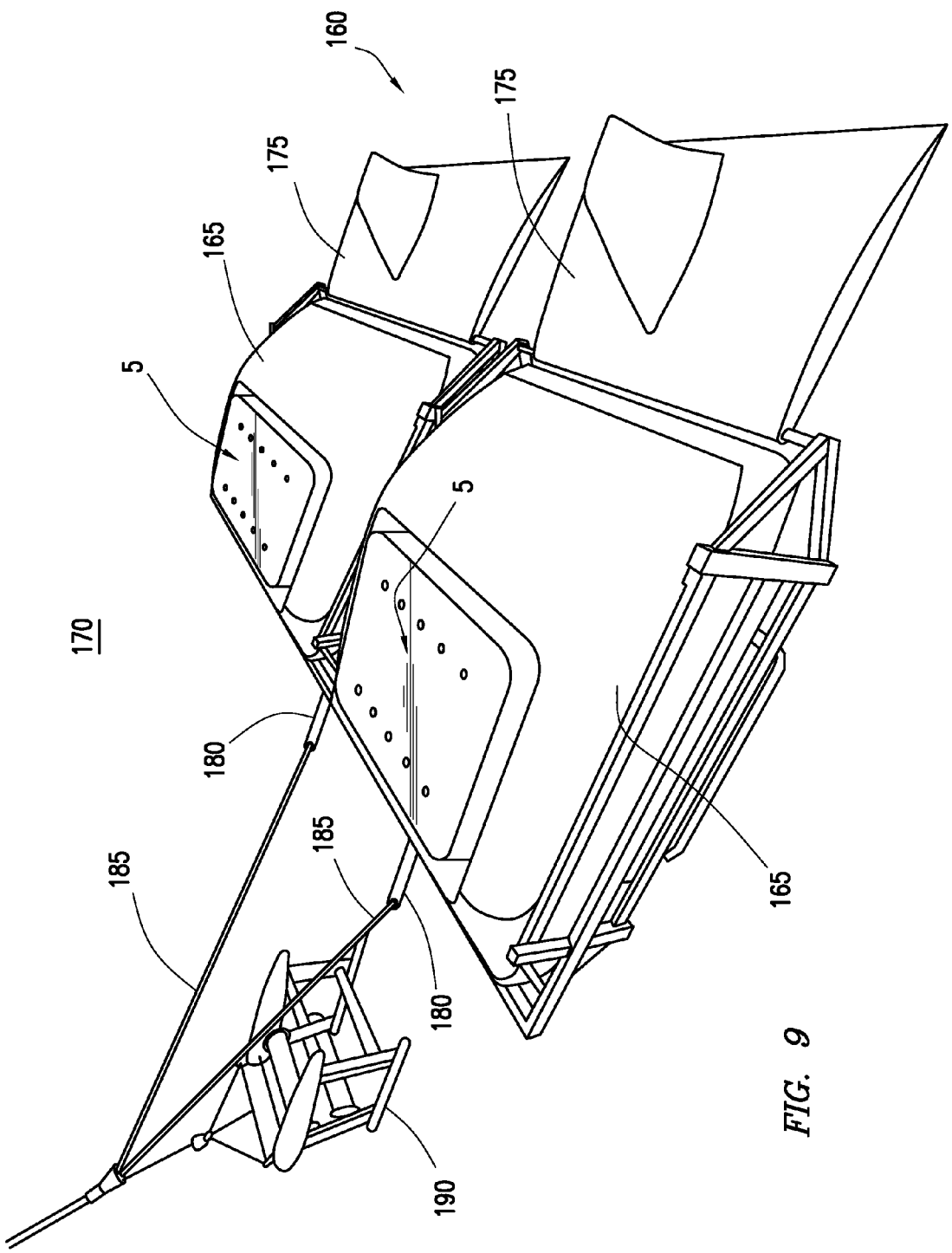
FIG. 9 illustrates one embodiment of an array of marine acoustic vibrators.
Figure 10:
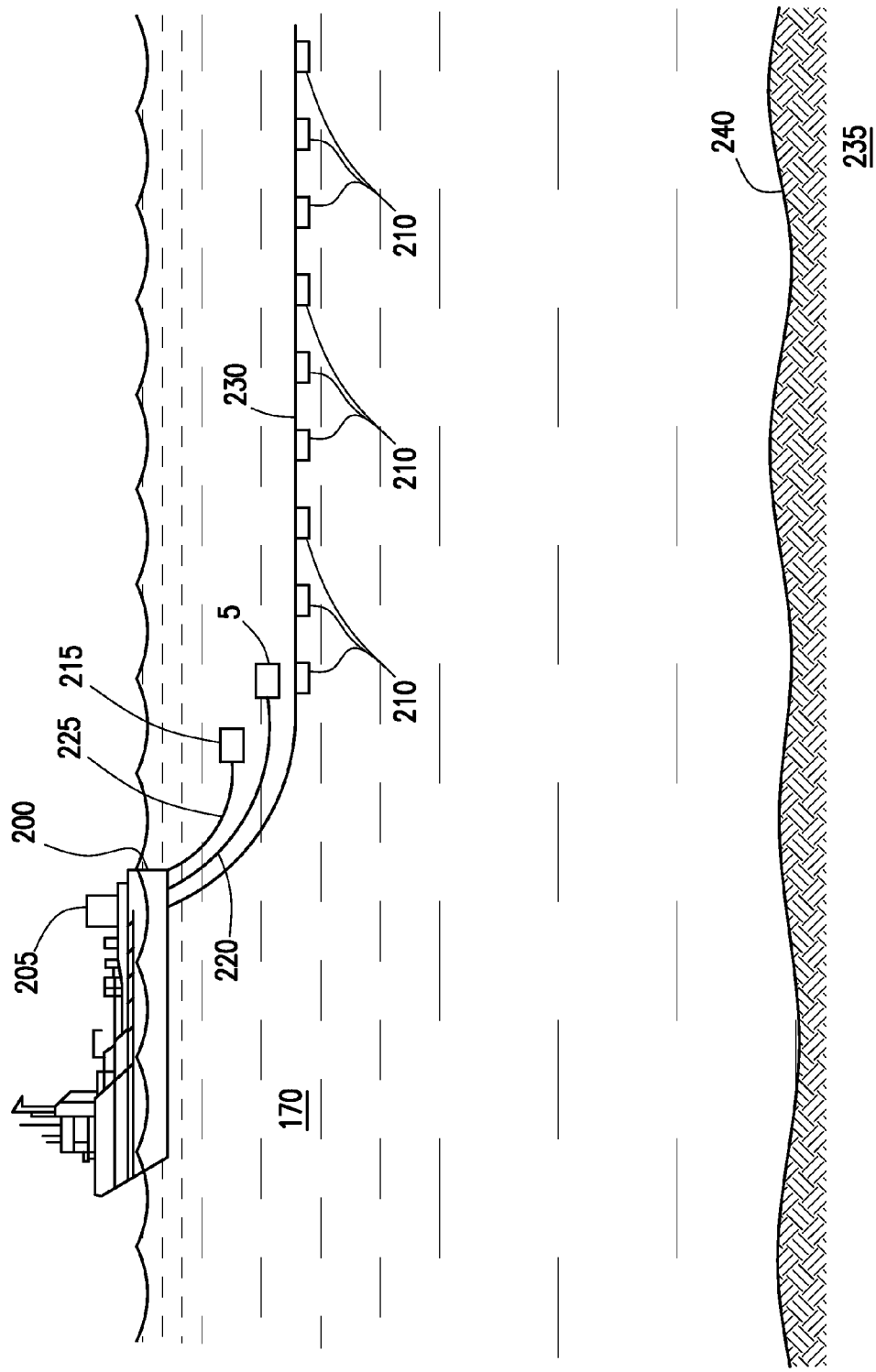
FIG. 10 illustrates one embodiment of a marine seismic survey system using a marine acoustic vibrator.

Turning now to FIG. 9, a diagram is provided illustrating one embodiment of an array 160 of marine acoustic vibrators 5. Depending on the desired acoustic energy output, it may be desired to use an array 160 of marine acoustic vibrators 5, such as those shown in FIGS. 1-3 and 5-7. For example, the two or more marine acoustic vibrators 5 in the array 160 may be used in sequence, contemporaneously, or even simultaneously. As would be understood by one of ordinary skill in the art with the benefit of this disclosure, energy emitted from the two or more marine acoustic vibrators 5 may appear in the rock formations below the water bottom as if it emanated from a point source when the dimensions of the array are on the order of about 30 meters or less. FIG. 9 illustrates two marine acoustic vibrators 5 in the array 160; however, more than two marine acoustic vibrators 5 may be used in the array 160, for example, depending on the desired acoustic energy output.

As illustrated, the marine acoustic vibrators 5 may each be disposed in a corresponding submersible vessel 165 for towing through a body of water 170. The submersible vessels 165 may be configured to support and position the marine acoustic vibrators 5 in the body of water 170. In some embodiments, the submersible vessels 165 may each include a fin 175, which may be used, for example, to position the corresponding marine acoustic vibrator 5 in the body of water 170. As illustrated, the submersible vessels 165 may each include a bracket 180 or other suitable attachment point for coupling the marine acoustic vibrators 5 to a corresponding lead line 185. In the illustrated embodiment, the array 160 may be used in conjunction with at least one hydrodynamic depressor 190 that may create thrust as moved through the body of water 170 to force the array 160 downward into the body of water 170. In some embodiments, the towing configuration may provide for towing the marine acoustic vibrators 5 at different depths. In some embodiments, the marine acoustic vibrators will be held apart by a support structure (not shown). When utilized, the support structure may couple the marine acoustic vibrators 5 to one or more lead lines 185. Such variations in towing configuration should be apparent to one of ordinary skill in the art with the benefit of this disclosure.

FIG. 9 illustrates an example technique for acquiring marine seismic data that can be used with embodiments of the present techniques. In the illustrated embodiment, a survey vessel 200 moves along the surface of the body of water 170, such as a lake or ocean. The survey vessel 200 may include thereon equipment, shown generally at 205 and collectively referred to herein as a "recording system." The recording system 205 may include devices (none shown separately) for detecting and making a time indexed record of signals generated by each of seismic sensors 210 (explained further below) and for actuating one or more sound sources (as illustrated, marine acoustic vibrator 5 and/or air guns 215) at selected times. The recording system 205 may also include devices (none shown separately) for determining the geodetic position of the survey vessel 200 and the various seismic sensors 210.

As illustrated, the survey vessel 200 (or a different vessel) may tow the marine acoustic vibrator 5 in the body of water 170. A source cable 220 may couple the marine acoustic vibrator 5 to the survey vessel 200. The marine acoustic vibrator 5 may be towed in the body of water 170 at a depth ranging from 0 meters to about 300 meters, for example. While only a single marine acoustic vibrator 5 is shown in FIG. 9, it is contemplated that embodiments may include more than one marine acoustic vibrator 5, or one or more arrays thereof (e.g., array 160 on FIG. 8). Optionally, the survey vessel 200 may further tow one or more air guns 215 (or other sound sources) by the same source cable 220 or different source cable 225. As illustrated, the air guns 215 may be towed at a different depth than the marine acoustic vibrator 5. While FIG. 9 illustrates the air guns 215 being towed at a shallower depth than the marine acoustic vibrator 5, it is contemplated that the air guns 215 may be towed at the same or a greater depth than the marine acoustic vibrator 5.

At selected times, the marine acoustic vibrator 5 (and/or the air guns 215) may be triggered, for example, by the recording system 205, to generate acoustic energy. The survey vessel 200 (or a different vessel) may further tow at least one sensor streamer 230 to detect the acoustic energy that originated from the marine acoustic vibrator 5 (and/or the air guns 215) after it has interacted, for example, with rock formations 235 below the water bottom 240. As illustrated, the marine acoustic vibrator 5, the air guns 215, and the sensor streamer 230 may be towed above the water bottom 240. The sensor streamer 230 may contain seismic sensors 210 thereon at spaced apart locations. While not shown, some marine seismic surveys locate seismic sensors 210 on ocean bottom cables or nodes in addition to, or instead of, a sensor streamer 230. The seismic sensors 210 may be any type of seismic sensors known in the art, including hydrophones, geophones, particle velocity sensors, particle displacement sensors, particle acceleration sensors, or pressure gradient sensors, for example. By way of example, the seismic sensors 210 may generate response signals, such as electrical or optical signals, in response to detected acoustic energy. Signals generated by the seismic sensors 210 may be communicated to the recording system 205. In some embodiments, more than one sensor streamer 230 may be towed by the survey vessel 200, and the sensor streamers 230 may be spaced apart laterally, vertically, or both laterally and vertically. The detected energy may be used to infer certain properties of the subsurface rock, such as structure, mineral composition, and fluid content, thereby providing information useful in the recovery of hydrocarbons.

In accordance with an embodiment of the invention, a geophysical data product may be produced. The geophysical data product may include data that is obtained by a process that includes detecting the acoustic energy originating from the marine acoustic vibrator 5. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless states otherwise. The above description is intended to cover such alternatives, modifications, and equivalents as would be apparent to a person skilled in the art having the benefit of this disclosure.

The scope of the present disclosure includes any feature of combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A marine acoustic vibrator comprising:
   a containment housing;
   a first piston plate;
   a second piston plate;
   a fixture extending along a major axis of the containment housing, wherein the fixture is coupled to either end of the containment housing;
   a first spring element coupled to the first piston plate and a first side of the fixture, a second spring element coupled to the second piston plate and a second side of the fixture, wherein the first spring element extends between the first side of the fixture and the first piston plate, and the second spring element extends between the second side of the fixture and the second piston plate; wherein the first and second spring elements each have selected spring constants to produce a first resonance frequency; and
   a driver coupled to the first and second piston plates and the fixture, wherein the driver is configured to move the first and second piston plates back and forth, wherein the fixture supports the driver in the containment housing.

2. The marine acoustic vibrator of claim 1, wherein the driver is a moving coil driver or a linear servo motor.

3. The marine acoustic vibrator of claim 1, wherein the first and second piston plates are coupled to the housing by way of a rubber seal, the first piston plate covering a first opening in a first side of the containment housing and the second piston plate covering a second opening in a second side of the containment housing.

4. The marine acoustic vibrator of claim 1, wherein the first and second piston plates are configured to not bend or flex during operation of the marine acoustic vibrator.

5. The marine acoustic vibrator of claim 1, wherein the first and second spring elements comprise at least one type of spring selected from the group consisting of: a bow spring, a coil spring, a flat spring, and a leaf spring.

6. The marine acoustic vibrator of claim 1, wherein the second spring element is disposed on an opposite side of the driver from the first spring element.

7. The marine acoustic vibrator of claim 1, wherein the first spring element is coupled to a supplemental fixture by way of bearings, the supplemental fixture being coupled to the fixture.

8. The marine acoustic vibrator of claim 1, wherein the marine acoustic vibrator is configured to have the first resonance frequency within a frequency range of about 1 Hz and about 200 Hz when disposed in water at a depth of about 0 meters to about 300 meters.

9. The marine acoustic vibrator of claim 8, wherein the marine acoustic vibrator further comprises a mass spring having weights affixed thereto, the mass spring being coupled between the first side of the fixture and the first piston plate.

10. The marine acoustic vibrator of claim 9, wherein the mass spring is configured to cause the marine acoustic vibrator to generate a second resonance frequency within the frequency range when disposed in water at a depth of about 0 meters to about 300 meters.

11. The marine acoustic vibrator of claim 8, wherein the frequency range is from about 1 Hz to about 10 Hz.

12. A marine acoustic vibrator comprising:
   a containment housing;
   a fixture extending along a major axis of the containment housing, wherein the fixture is coupled to either end of the containment housing;
   a first piston plate coupled to the containment housing;
   a first driver disposed at least partially within the marine acoustic vibrator, the first driver being coupled to the fixture and the first piston plate, wherein the first driver is configured to move the first piston plate back and forth, wherein the fixture supports the first driver in the containment housing;
   a first pair of spring elements coupled to the first piston plate and a first side of the fixture, wherein the first pair of spring elements has a selected spring constant to produce a first resonance frequency;
   a second piston plate coupled to the containment housing opposite the first piston plate;
   a second driver disposed at least partially within the marine acoustic vibrator, the second driver being coupled to the fixture and the second piston plate, wherein the second driver is configured to move the second piston plate back and forth, wherein the fixture supports the second driver in the containment housing; and a second pair of spring elements coupled to the second piston plate and a second side of the fixture, wherein the second pair of spring elements has a selected spring constant.

13. The marine acoustic vibrator of claim 12, wherein the first piston plate and the second piston plate are configured to not bend or flex during operation of the marine acoustic vibrator.

14. The marine acoustic vibrator of claim 12, wherein at least one of the first pair of spring elements or the second pair of spring elements comprises at least one type of spring selected from the group consisting of: a bow spring, a coil spring, a flat spring, and a leaf spring.

15. The marine acoustic vibrator of claim 12, wherein the first and second drivers, the first piston plate, the second piston plate, the first pair of spring elements, and the second pair of spring elements cause the marine acoustic vibrator to generate the first resonance frequency within a frequency range of about 1 Hz and about 10 Hz when disposed in water at a depth of about 0 meters to about 300 meters.

16. The marine acoustic vibrator of claim 12, wherein the marine acoustic vibrator further comprises a mass spring having weights affixed thereto, the mass spring being coupled between the fixture and the first piston plate.

17. A method comprising:
providing a marine acoustic vibrator, wherein the marine acoustic vibrator comprises:
a containment housing;
a first piston plate;
a second piston plate;
a fixture extending along a major axis of the containment housing, wherein the fixture is coupled to either end of the containment housing;
a first spring element coupled to the first piston plate and a first side of the fixture, a second spring element coupled to the second piston plate and a second side of the fixture, wherein the first spring element extends between the first side of the fixture and the first piston plate, and the second spring element extends between the second side of the fixture and the second piston plate; wherein the first and second spring elements have selected spring constants; and
a driver coupled to the first and second piston plates and the fixture, wherein the driver is configured to move the first and second piston plates back and forth, wherein the fixture supports the driver in the containment housing; and
triggering the marine acoustic vibrator in a body of water in conjunction with a marine seismic survey to cause the first and second piston plates in the marine acoustic vibrator to move back and forth, such that the marine acoustic vibrator has a first resonance frequency based at least in part, on the selected spring constants, wherein the first and second spring elements exert biasing forces against the first and second piston plates.

18. The method of claim 17, further comprising towing one or more additional marine acoustic vibrators in an array with the marine acoustic vibrator.

19. The method of claim 17, further comprising towing the marine acoustic vibrator in the body of water.

20. The method of claim 17, further comprising towing one or more air guns in conjunction with the marine seismic survey, and triggering the one or more air guns to generate acoustic energy.

21. The method of claim 17, wherein the marine acoustic vibrator generates the first resonance frequency within a frequency range of about 1 Hz and about 10 Hz.

22. The method of claim 21, wherein the marine acoustic vibrator further comprises a mass spring having weights affixed thereto, the mass spring being coupled between the fixture and the piston plate, and wherein the mass spring generates a second resonance frequency within the frequency range.

23. The method of claim 17, further comprising:
obtaining geophysical data; and
processing the geophysical data to generate a geophysical data product,
wherein the geophysical data is obtained by a process that includes detecting acoustic energy originating from the marine acoustic vibrator.

24. The method of claim 23, further comprising recording the geophysical data product on a tangible, non-volatile computer-readable medium suitable for importing onshore.

25. The method of claim 23, further comprising performing geophysical analysis onshore on the geophysical data product.

* * * * *